(12) United States Patent
Kawakatsu et al.

(10) Patent No.: US 7,788,937 B2
(45) Date of Patent: Sep. 7, 2010

(54) REFRIGERATION SYSTEM

(75) Inventors: Noriyasu Kawakatsu, Osaka (JP); Takashi Sugimoto, Osaka (JP); Shigeto Tanaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 438 days.

(21) Appl. No.: 11/990,305

(22) PCT Filed: Sep. 8, 2006

(86) PCT No.: PCT/JP2006/317834

§ 371 (c)(1),
(2), (4) Date: Feb. 11, 2008

(87) PCT Pub. No.: WO2007/029803

PCT Pub. Date: Mar. 15, 2007

(65) Prior Publication Data

US 2009/0151378 A1 Jun. 18, 2009

(30) Foreign Application Priority Data

Sep. 9, 2005 (JP) ............................. 2005-261783

(51) Int. Cl.
*F25D 17/00* (2006.01)
*F25B 49/00* (2006.01)

(52) U.S. Cl. .............................. 62/180; 62/197; 62/225
(58) Field of Classification Search .................. 62/149, 62/178, 180, 196.4, 197, 222, 225
See application file for complete search history.

(56) References Cited

U.S. PATENT DOCUMENTS

| 4,745,767 A | * | 5/1988 | Ohya et al. | .................... 62/211 |
| 5,289,692 A | * | 3/1994 | Campbell et al. | ............. 62/181 |
| 6,058,728 A | * | 5/2000 | Takano et al. | ............. 62/196.4 |

FOREIGN PATENT DOCUMENTS

| JP | 4-125165 U | 11/1992 |
| JP | 7-35430 A | 2/1995 |
| JP | 7-43007 A | 2/1995 |
| JP | 8-28982 A | 2/1996 |
| JP | 2002-327964 A | 11/2002 |
| JP | 2005-180815 A | 7/2005 |

* cited by examiner

*Primary Examiner*—Marc E Norman
(74) *Attorney, Agent, or Firm*—Birch, Stewart, Kolasch & Birch, LLP

(57) ABSTRACT

If the degree of opening of an electronic expansion valve (14) is kept below a specified degree of opening or if the degree of superheat of refrigerant at an evaporator (15) side is kept above a specified degree of superheat, the amount of circulating refrigerant is judged to be insufficient. Thus, the volume of an air delivered by an evaporator fan (22) is reduced.

13 Claims, 4 Drawing Sheets

FIG. 3

If relationship of degree of opening of EV ≦15% is kept for ten or more minutes
or
if relationship of degree of superheat of refrigerant in evaporator ≧25°C is kept for ten or more minutes If relationship of degree of opening of EV ≦15% is kept for ten or more minutes
or
if relationship of degree of superheat of refrigerant in evaporator ≧25°C is kept for ten or more minutes

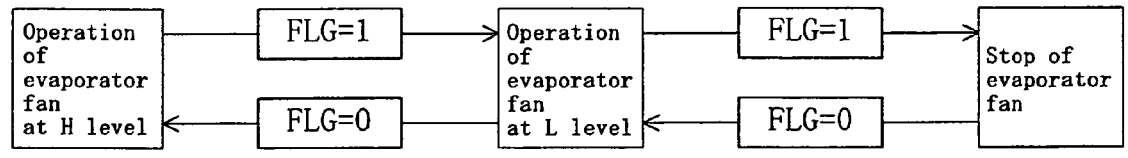

if relationship of degree of opening of EV ≧40% is kept for three or more minutes
and
relationship of degree of superheat of refrigerant in evaporator ≦6°C is kept for three or more minutes {If relationship of degree of opening of EV ≧40% is kept for three or more minutes
and
relationship of degree of superheat of refrigerant in evaporator ≦6°C is kept for three or more minutes}
or
if stop of evaporator fan is kept for two or more minutes

FIG. 4

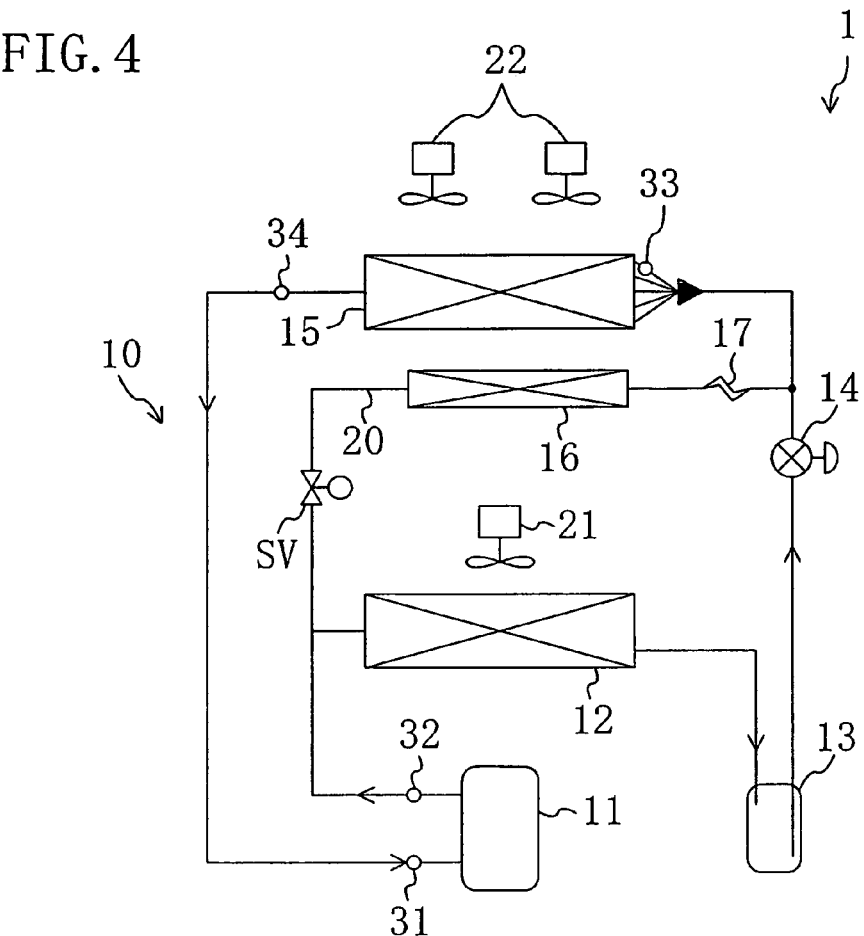

FIG. 5

If relationship of degree of opening of EV
≦15% is kept for ten or more minutes
or
if relationship of degree of superheat of
refrigerant in evaporator
≧25°C is kept for ten or more minutes

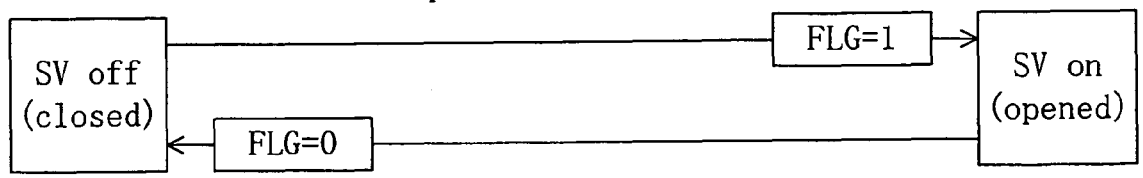

{If relationship of degree of opening of EV
≧40% is kept for three or more minutes
and
relationship of degree of superheat of refrigerant in
evaporator
≦6°C is kept for three or more minutes}
or
if SV is kept on for one or more hours

REFRIGERATION SYSTEM

TECHNICAL FIELD

The present invention relates to refrigeration systems for use in freight containers or other purposes, and more particularly relates to a measure for oil return in a refrigeration system of the above-described type.

BACKGROUND ART

Conventionally, refrigeration systems have been known which are utilized for freight containers or other purposes and cool the inside of such containers.

For example, a refrigeration system disclosed in Patent Document 1 includes a refrigerant circuit for cooling the inside of a container. This refrigerant circuit is connected with a compressor, a condenser, an electronic expansion valve, and an evaporator in this order. The condenser is placed outside the container. A condenser fan is placed in the vicinity of the condenser. On the other hand, the evaporator is placed inside the container. An evaporator fan is placed in the vicinity of the evaporator. The degree of opening of the electronic expansion valve is controlled to maintain the degree of superheat of refrigerant at the evaporator side within a predetermined range.

During, for example, chilling operation of this refrigeration system, the condenser fan, the evaporator fan and the compressor are operated. When refrigerant compressed by the compressor is delivered to the condenser, the condenser is operated in the following manner: Heat is exchanged between an outdoor air delivered by the condenser fan and the refrigerant, and then the refrigerant releases heat to the outdoor air and is condensed. Thereafter, the refrigerant is reduced in pressure by the electronic expansion valve and then flows into the evaporator. In the evaporator, heat is exchanged between an indoor air delivered by the evaporator fan and the refrigerant, and the refrigerant absorbs heat from the indoor air and evaporates. As a result, the indoor air in the container is cooled. The refrigerant that has evaporated in the evaporator is sucked into the compressor and again compressed.

Patent Document 1: Japanese Unexamined Patent Application Publication No. 2002-327964

DISCLOSURE OF INVENTION

Problems that the Invention is to Solve

Meanwhile, in a case where, in such a refrigeration system as in Patent Document 1, an indoor air is cooled, for example, under a high indoor cooling load, this situation facilitates increasing the degree of superheat of refrigerant at an evaporator side. Therefore, in order to reduce this degree of superheat, the degree of opening of an electronic expansion valve is controlled to increase. Meanwhile, for a ship passing through an area in which the ambient temperature is extremely high, such as an equatorial area, in some cases, the outdoor temperature may become extremely high (e.g., 50° C.). Therefore, when the heat release rate of a condenser is insufficient under circumstances where the degree of opening of an electronic expansion valve is larger, this situation may lead to an abnormal rise in the high pressure in a refrigerant circuit.

In order to solve the above-mentioned known problem, it is considered that when the high pressure in the refrigerant circuit exceeds a specified pressure, the degree of opening of the electronic expansion valve is reduced, resulting in a reduction in the high pressure. More particularly, in a case where the high pressure unusually rises under control where the degree of opening of the electronic expansion valve is adjusted according to the degree of superheat of refrigerant at the evaporator side, a forcible reduction in the degree of opening of the electronic expansion valve decreases the amount of circulating refrigerant. This decrease can prevent the high pressure in the refrigerant circuit from rising.

However, when, as described above, the forcible reduction in the degree of opening of the electronic expansion valve decreases the amount of refrigerant circulating through the refrigerant circuit, this decrease leads also to a reduction in the amount of oil returned to the compressor, i.e., the amount of refrigerating machine oil in discharged refrigerant from the compressor being again sucked into the compressor so as to be recovered. Consequently, the amount of refrigerating machine oil for lubricating a compression mechanism or other mechanisms of the compressor becomes insufficient. This may cause damage to the compressor.

The present invention is made in view of the above-mentioned problems, and its object is to provide a refrigeration system that can ensure a sufficient amount of oil returned to a compressor while restraining the high pressure from rising.

Means of Solving the Problems

A first aspect of the invention is directed to a refrigeration system including a refrigerant circuit connected with a compressor, a condenser, an electronic expansion valve, and an evaporator placed indoors and operating in a refrigeration cycle while refrigerant is circulated through the refrigerant circuit. The degree of opening of the electronic expansion valve is adjusted according to the degree of superheat of refrigerant at the evaporator side while being forcibly reduced under conditions that the high pressure in the refrigerant circuit is above a specified pressure. The refrigeration system further includes an evaporator fan for delivering an indoor air to the evaporator and a controller for, when the amount of the refrigerant circulating through the refrigerant circuit is judged to be insufficient, reducing the volume of an air delivered by the evaporator fan.

In the refrigeration system according to the first aspect of the invention, the refrigeration cycle is performed in the refrigerant circuit (10), thereby exchanging heat between the refrigerant and the indoor air in the evaporator (15) and thus cooling the indoor air. The degree of opening of the electronic expansion valve (14) of this refrigeration system is basically adjusted according to the degree of superheat of the refrigerant in the evaporator (15). However, on condition that the high pressure is above the specified pressure, the above-described degree of opening is forcibly reduced to restrain a rise in the high pressure. In this case, when, as described above, the degree of opening of the electronic expansion valve (14) remains reduced, the amount of the refrigerant circulating through the refrigerant circuit (10) is reduced, resulting in lack of the amount of oil returned to the compressor (11).

In the present invention, in order to prevent such lack of the amount of oil returned to the compressor (11), when the amount of the refrigerant circulating through the refrigerant circuit (10) is judged to be insufficient, the controller (40) allows the volume of the air delivered by the evaporator fan (22) to become lower than that during normal operation. As a result, the amount of heat absorbed in the refrigerant in the evaporator (15) is reduced, resulting in a reduction in the amount of heat released from refrigerant in the condenser (12). Even under conditions that a sufficient amount of heat released from the refrigerant in the condenser (12) is less likely to be ensured, for example, even under a high outdoor temperature, the refrigerant is certainly condensed in the condenser (12). This situation can reduce the high pressure in the refrigerant circuit (10). In view of the above, the forcibly reduced degree of opening of the electronic expansion valve (14) can be increased. This increases the amount of the refrigerant circulating through the refrigerant circuit (10), and thus lack of the amount of oil returned to the compressor (11) is resolved.

A second aspect of the invention is directed to a refrigeration system including a refrigerant circuit connected with a compressor, a condenser, an electronic expansion valve, and an evaporator and operating in a refrigeration cycle while refrigerant is circulated through the refrigerant circuit. The degree of opening of the electronic expansion valve is adjusted according to the degree of superheat of refrigerant at the evaporator side while being forcibly reduced under conditions that the high pressure in the refrigerant circuit is above a specified pressure. This refrigeration system further includes an evaporator fan for delivering an indoor air to the evaporator and a controller for, when the amount of the refrigerant circulating through the refrigerant circuit is judged to be insufficient, changing operation of the evaporator fan from continuous operation to intermittent operation.

According to a second aspect of the invention, in the refrigeration system to which the second aspect of the invention is directed as in the case of the first aspect of the invention, when the amount of the refrigerant circulating through the refrigerant circuit (10) is judged to be insufficient, the controller (40) allows the evaporator fan (22) to be intermittently operated. As a result, the amount of heat absorbed in the refrigerant in the evaporator (15) is reduced, resulting in a reduction in the high pressure in the refrigerant circuit (10). In view of the above, the forcibly reduced degree of opening of the electronic expansion valve (14) can be increased. This increases the amount of the refrigerant circulating through the refrigerant circuit (10), and thus lack of the amount of oil returned to the compressor (11) is resolved.

A third aspect of the invention is directed to a refrigeration system including a refrigerant circuit connected with a compressor, a condenser, an electronic expansion valve, and an evaporator and operating in a refrigeration cycle while refrigerant is circulated through the refrigerant circuit. The degree of opening of the electronic expansion valve is adjusted according to the degree of superheat of refrigerant at the evaporator side while being forcibly reduced under conditions that the high pressure in the refrigerant circuit is above a specified pressure. The refrigerant circuit of the refrigeration system is provided with a bypass pipe connected at one end between the compressor and the condenser and connected at the other end between the electronic expansion valve and the evaporator and a closing/opening valve for closing and opening the bypass pipe. The refrigeration system further includes a controller for, when the amount of the refrigerant circulating through the refrigerant circuit is judged to be insufficient, opening the closing/opening valve.

In the refrigeration system according to the third aspect of the invention, when the compressor (11) is operated with the closing/opening valve (SV) for the bypass pipe (20) closed, a normal refrigeration cycle is performed in the refrigerant circuit (10). On the other hand, when, during such a normal operation, the amount of the refrigerant circulating through the refrigerant circuit (10) is judged to be insufficient, the controller (40) allows the closing/opening valve (SV) to open. As a result, part of the refrigerant discharged from the compressor (11) is delivered to the bypass pipe (20), and the rest thereof is delivered to the condenser (12). When, in this way, the part of the refrigerant is delivered through the bypass pipe (20) to the evaporator (15), this delivery reduces the amount of the refrigerant flowing through the condenser (12). Therefore, the refrigerant can be certainly condensed in this condenser (12), resulting in a reduction in the high pressure in the refrigerant circuit (10). In view of the above, the forcibly reduced degree of opening of the electronic expansion valve (14) can be increased. This increases the amount of the refrigerant circulating through the refrigerant circuit (10), and thus lack of the amount of oil returned to the compressor (11) is resolved.

The refrigeration system according to a fourth aspect of the invention is characterized in that, in the third aspect of the invention, the bypass pipe may be provided with a heating heat exchanger for heating an indoor air by the refrigerant and the evaporator may be placed indoors.

In the fourth aspect of the invention, the bypass pipe (20) is provided with the heating heat exchanger (16). In this case, when the amount of the refrigerant circulating through the refrigerant circuit (10) is judged to be insufficient and thus the solenoid valve (SV) is opened, part of the refrigerant discharged from the compressor (11) passes through the bypass pipe (20) and then flows through the heating heat exchanger (16). In the heating heat exchanger (16), while refrigerant is condensed by releasing heat of the refrigerant to the indoor air, the indoor air is heated by the refrigerant. As described above, when the refrigerant is condensed by both the heating heat exchanger (16) and the condenser (12), the high pressure in the refrigerant circuit (10) can be further certainly reduced. In view of the above, the forcibly reduced degree of opening of the electronic expansion valve (14) can be increased. This increases the amount of the refrigerant circulating through the refrigerant circuit (10), and thus lack of the amount of oil returned to the compressor (11) is resolved.

A fifth aspect of the invention is characterized in that, in any one of the first through fourth aspects of the invention, when the degree of superheat of the refrigerant in the evaporator is kept above a specified degree of superheat for a predetermined time, the controller may judge that the amount of the circulating refrigerant is insufficient.

In the refrigeration system according to the fifth aspect of the invention, whether or not the amount of the refrigerant circulating through the refrigerant circuit (10) is insufficient is judged on the basis of the degree of superheat of the refrigerant in the evaporator (15). More particularly, when the degree of superheat of the refrigerant in the evaporator (15) is kept above the specified degree of superheat, the amount of the refrigerant flowing through the evaporator (15), i.e., the amount of the circulating refrigerant, can be estimated to be obviously insufficient. Therefore, in such a case, the controller (40) reduces the high pressure in the refrigerant circuit (10) using the measures described in the first through fourth aspects of the invention. As a result, the degree of opening of the electronic expansion valve (14) can be increased. This increases the amount of the refrigerant circulating through the refrigerant circuit (10), and thus lack of the amount of oil returned to the compressor (11) is resolved.

A sixth aspect of the invention is characterized in that, in any one of the first through fourth aspects of the invention, when the degree of opening of the electronic expansion valve is kept below a specified degree of opening for a predetermined time, the controller may judge that the amount of the circulating refrigerant is insufficient.

In the refrigeration system according to the sixth aspect of the invention, whether or not the amount of the refrigerant circulating through the refrigerant circuit (10) is insufficient is judged on the basis of the degree of opening of the electronic expansion valve (14). More particularly, when the degree of opening of the electronic expansion valve (14) is kept below the specified degree of opening, the amount of the circulating refrigerant can be estimated to be obviously insufficient. Therefore, in such a case, the controller (40) reduces the high pressure in the refrigerant circuit (10) using the measures described in the first through fourth aspects of the invention. As a result, the degree of opening of the electronic expansion valve (14) can be increased. This increases the amount of the refrigerant circulating through the refrigerant circuit (10), and thus lack of the amount of oil returned to the compressor (11) is resolved.

A seventh aspect of the invention is characterized in that, in any one of the first through sixth aspects of the invention, the compressor may be composed of a scroll compressor (11).

In the seventh aspect of the invention, a scroll compressor (11) is used as the compressor connected to the refrigerant circuit (10). The scroll compressor (11) is characterized in that the amount of refrigerating machine oil in the discharged refrigerant from the scroll compressor (11) is typically larger than that from any other compressor (e.g., a reciprocating compressor). In other words, in the present invention, in use of the scroll compressor (11) to which, in particular, damage is more likely to be caused due to lack of the amount of the returned oil, lack of the amount of the oil returned to the compressor (11) is effectively resolved.

Effects of the Invention

According to the present invention, for example, under conditions that the outdoor temperature is extremely high, when the high pressure is above the specified pressure, the degree of opening of the electronic expansion valve (14) is forcibly reduced, thereby avoiding an abnormal rise in the high pressure in the refrigerant circuit (10). When, as described above, the degree of opening of the electronic expansion valve (14) is reduced, the amount of the circulating refrigerant may become insufficient, and as a result, the amount of oil returned to the compressor (11) may also become insufficient. To cope with this, according to the first aspect of the invention, on condition that, as described above, the amount of the circulating refrigerant is insufficient, the volume of the air delivered by the evaporator fan (22) is reduced. Therefore, the high pressure in the refrigerant circuit (10) can be certainly reduced, and the degree of opening of the electronic expansion valve (14) can be increased. In view of the above, while an abnormal rise in the high pressure in the refrigerant circuit (10) is prevented, lack of the amount of the circulating refrigerant in the refrigerant circuit (10) is resolved, and thus a sufficient amount of oil returned to the compressor (11) can be ensured.

According to the second aspect of the invention, on condition that the amount of the circulating refrigerant is insufficient, the evaporator fan (22) is intermittently operated. Therefore, as in the first aspect of the invention, while the high pressure in the refrigerant circuit (10) is reduced, the degree of opening of the electronic expansion valve (14) can be increased. In view of the above, lack of the amount of the refrigerant circulating through the refrigerant circuit (10) is resolved, and thus a sufficient amount of oil returned to the compressor (11) can be ensured.

Furthermore, according to the third aspect of the invention, on condition that the amount of the circulating refrigerant is insufficient, the refrigerant discharged from the compressor (11) is directly delivered between the electronic expansion valve (14) and the evaporator (15). As a result, the refrigerant can be certainly condensed in the condenser (12), resulting in a reduction in the high pressure in the refrigerant circuit (10).

In view of the above, lack of the amount of the refrigerant circulating through the refrigerant circuit (10) is resolved, and thus a sufficient amount of oil returned to the compressor (11) can be ensured.

In particular, according to the fourth aspect of the invention, the refrigerant directly delivered to the bypass pipe (20) is condensed in the heating heat exchanger (16). Therefore, the high pressure in the refrigerant circuit (10) can be further effectively reduced, and lack of the amount of the refrigerant circulating through the refrigerant circuit (10) can be effectively resolved.

Furthermore, in the heating heat exchanger (16), the indoor air can be heated by heat released in condensation of the refrigerant. Therefore, this heating heat exchanger (16) can be utilized for a reheat coil for adjusting the humidity of the indoor air, a drain pan heater for melting a block of ice recovered in a drain pan, and any other component.

According to the fifth aspect of the invention, when the degree of superheat of the refrigerant in the evaporator (15) is kept above the specified degree of superheat, the amount of the circulating refrigerant is judged to be insufficient. Therefore, lack of the amount of the refrigerant circulating through the refrigerant circuit (10) can be appropriately sensed, and lack of the amount of oil returned to the compressor (11) can be resolved with reliability. Furthermore, according to the present invention, a sensor for detecting the degree of superheat of the refrigerant in the evaporator (15) can be utilized for both superheat control using the electronic expansion valve (14) and a sensor for sensing lack of the amount of the circulating refrigerant.

Meanwhile, according to the sixth aspect of the invention, when the degree of opening of the electronic expansion valve (14) is kept below the specified degree of opening, the amount of the circulating refrigerant is judged to be insufficient. In view of the above, lack of the amount of the refrigerant circulating through the refrigerant circuit (10) can be simply sensed, and lack of the amount of oil returned to the compressor (11) can be easily resolved.

Moreover, according to the seventh aspect of the invention, lack of the amount of oil returned to the scroll compressor (11) in which refrigerating machine oil is particularly more likely to be insufficient is resolved. Therefore, the effects of the present invention become more remarkable.

BRIEF DESCRIPTION OF DRAWINGS

FIG. 3 is a state transition diagram of an evaporator fan according to the first embodiment.

FIG. 4 is a piping diagram showing a schematic configuration of a refrigeration system according to the second embodiment.

FIG. 5 is a state transition diagram of a solenoid valve according to the second embodiment.

Figure 1:
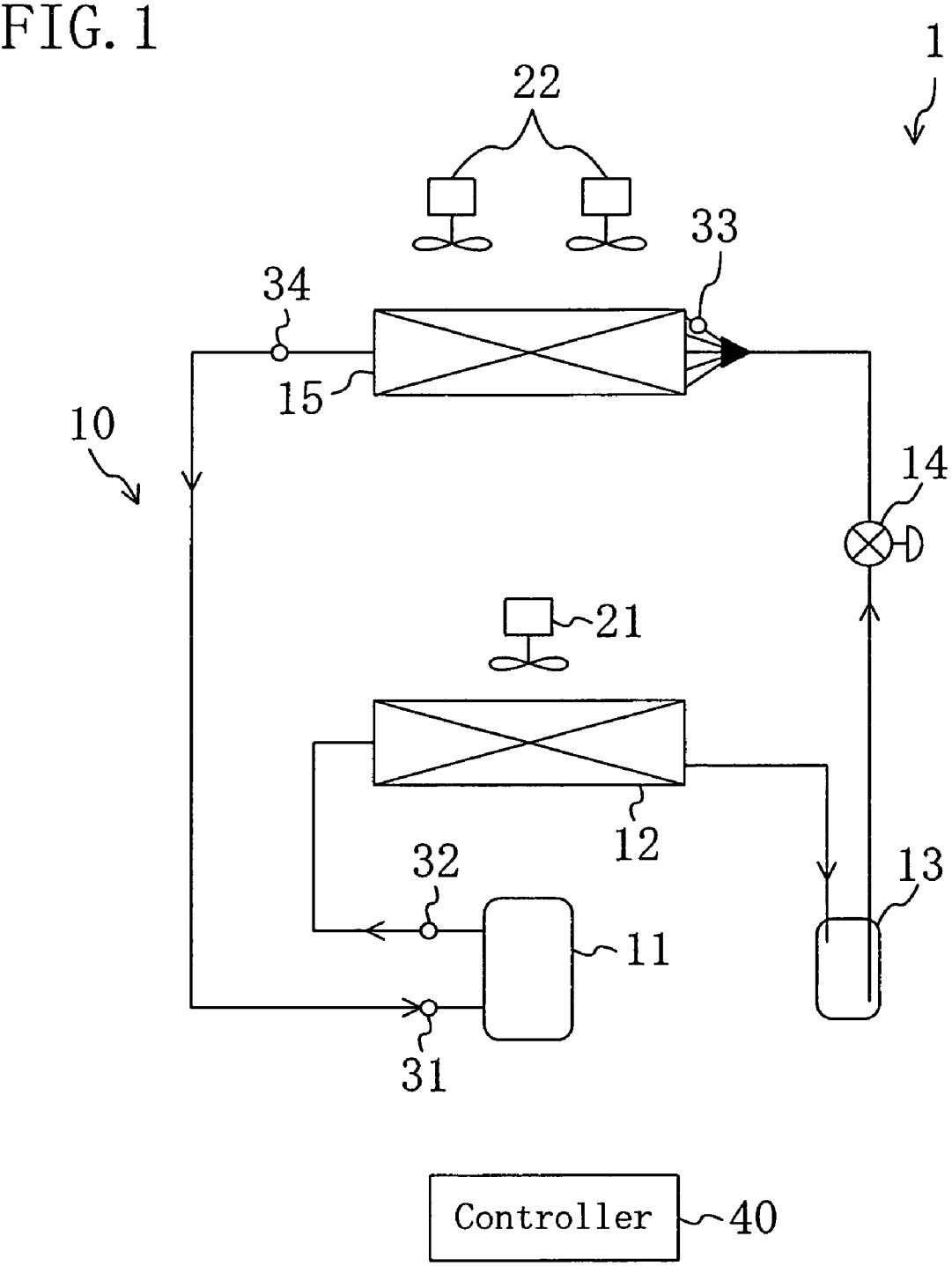
FIG. 1 is a piping diagram showing a schematic configuration of a refrigeration system according to a first embodiment.

DESCRIPTION OF NUMERALS 1 refrigeration system
10 refrigerant circuit
11 scroll compressor (compressor)
12 condenser
14 electronic expansion valve 15 evaporator
16 reheat coil (heating heat exchanger)
22 evaporator fan
40 controller

BEST MODE FOR CARRYING OUT THE INVENTION

Embodiments of the present invention will be more particularly described hereinafter with reference to the drawings.

Embodiment 1

A refrigeration system (1) of a first embodiment is for cooling the inside of a container for use in maritime transportation or any other purpose. As shown in FIG. 1, this refrigeration system (1) includes a refrigerant circuit (10) through which refrigerant is circulated and which thereby operates in a vapor compression refrigeration cycle.

The refrigerant circuit (10) is connected sequentially with a compressor (11), a condenser (12), a liquid receiver (13), an electronic expansion valve (14), and an evaporator (15) serving as the main components.

The compressor (11) is composed of a scroll-type fixed displacement compressor. The condenser (12) is placed outdoors. A condenser fan (21) is disposed in the vicinity of the condenser (12) to deliver an outdoor air to the condenser (12). In the condenser (12), heat is exchanged between the outdoor air delivered by the condenser fan (21) and refrigerant. The liquid receiver (13) is a cylindrical gastight enclosure and can store surplus liquid refrigerant in its bottom part. The electronic expansion valve (14) is configured so that its degree of opening can be adjusted. The degree of opening of the electronic expansion valve (14) is adjusted according to the degree of superheat of refrigerant at the evaporator (15) side and the refrigerant pressure on the high pressure side of the refrigerant circuit (10). This control procedure for the degree of opening of the electronic expansion valve (14) will be described later in detail. The evaporator (15) is placed inside the container and forms a cooling heat exchanger for cooling the inside of the container. An evaporator fan (22) is disposed in the vicinity of this evaporator (15) to deliver an indoor air to the evaporator (15). In the evaporator (15), heat is exchanged between the indoor air delivered by the evaporator fan (22) and refrigerant.

Furthermore, the refrigerant circuit (10) is connected with a plurality of sensors. More specifically, the refrigerant circuit (10) is provided with a low-pressure sensor (31), a high-pressure sensor (32), an evaporator entrance sensor (33), and an evaporator exit sensor (34). The low-pressure sensor (31) is connected to a suction pipe of the compressor (11) to detect the refrigerant pressure LPT on the low pressure side of the refrigerant circuit (10). The high-pressure sensor (32) is connected to a discharge pipe of the compressor (11) to detect the refrigerant pressure HPT on the high pressure side of the refrigerant circuit (10). The evaporator entrance sensor (33) is connected to a flow divider on the inflow side of the evaporator (15) to detect the temperature EIS of refrigerant flowing into the evaporator (15). The evaporator exit sensor (34) is connected to the outflow side of the evaporator (15) to detect the temperature EOS of refrigerant flowing out of the evaporator (15).

The refrigeration system (1) is provided also with a controller (40). The controller (40) controls the electronic expansion valve (14), the fans (21, 22) and other components on the basis of detection signals from the sensors (31, 32, 33, 34) or any other component.

—Operational Behavior—

This refrigeration system (1) is capable of chilling operation for chilling reserve materials in a container and freezing operation for freezing reserve materials in the container. The chilling operation of the refrigeration system (1) will be described hereinafter.

At the beginning of the chilling operation, the condenser fan (21) is operated at a predetermined air volume while the evaporator fan (22) is operated at a high air-volume level (H). In addition, the degree of opening of the electronic expansion valve (14) is adjusted according to the difference between the temperature detected by the evaporator exit sensor (34) and the temperature detected by the evaporator entrance sensor (33), i.e., the degree of superheat of the refrigerant in the evaporator (15) (EOS-EIS).

The operation of the compressor (11) allows refrigerant compressed by the compressor (11) to flow into the condenser (12). In the condenser (12), the refrigerant releases heat to the outdoor air and is condensed. Thereafter, the condensed refrigerant passes through the electronic expansion valve (14) by way of the liquid receiver (13), is reduced in pressure and then flows into the evaporator (15). In the evaporator (15), the refrigerant absorbs heat from the indoor air and evaporates. As a result, the inside of the container is cooled. The refrigerant evaporated in the evaporator (15) is sucked into the compressor (11) and again compressed by the compressor (11).

During chilling operation as described above, for example, under conditions that an indoor cooling load is high, the degree of opening of the electronic expansion valve (14) is kept large to keep the degree of superheat of the refrigerant in the evaporator (15) constant. On the other hand, under such conditions, if the outdoor temperature is extremely high (for example, 50° C.), continuation of such operation may lead to an abnormal rise in the high pressure HPT in the refrigerant circuit.

To cope with this, the refrigeration system (1) of this embodiment is configured such that, in order to restrain such an abnormal rise in the high pressure, the degree of opening of the electronic expansion valve (EV) (14) is controlled. Control of the degree of opening of the electronic expansion valve (14) will be described hereinafter with reference to the flow chart in FIG. 2.

For control of the degree of opening of the electronic expansion valve (14), in steps S1 through S4, the degree of opening of the electronic expansion valve (14) is controlled so that the refrigerant pressure (high pressure HPT) detected by the high-pressure sensor (32) is not above specified pressures. More specifically, in step S1, a comparison is made between the high pressure HPT and a first specified pressure (e.g., 2300 kPa). When, in step S1, the high pressure HPT is higher than the first specified pressure, the control process proceeds to step S2 in which the degree of opening of the electronic expansion valve (14) is reduced by 10% (10% of the full-open condition of the electronic expansion valve). On the other hand, when, in step S1, the high pressure HPT is equal to or lower than the first specified pressure, the control process proceeds to step S3. In step S3, a comparison is made between the high pressure HPT and a second specified pressure (e.g., 2100 kPa). When, in step S3, the high pressure HPT is higher than the second specified pressure, the control process proceeds to step S4 in which the degree of opening of the electronic expansion valve (14) is reduced by 5%. On the other hand, when, in step S3, the high pressure HPT is equal to or lower than the second specified pressure, the control process proceeds to step S5. As described above, when, in steps S1 through S4, the high pressure HPT is above the specified pressures, the degree of opening of the electronic expansion valve (14) is forcibly reduced. This reduction prevents an abnormal rise in the high pressure HPT even under conditions that the outdoor temperature is extremely high.

Furthermore, in steps S5 through S8, the degree of opening of the electronic expansion valve (14) is adjusted such that the degree of superheat of the refrigerant in the evaporator (15) (EOS-EIS) falls within a range of 1° C. through 6° C. More particularly, when, in step S5, the degree of superheat (EOS-EIS) is smaller than 1° C., the degree of opening of the electronic expansion valve (14) is reduced by 1.5% in step S6. On the other hand, when, in step S7, the degree of superheat (EOS-EIS) is larger than 6° C., the degree of opening of the electronic expansion valve (14) is increased by 1.5% in step S7. As described above, when, in steps S5 through S8, the degree of superheat (EOS-EIS) falls outside the predetermined range, the degree of opening of the electronic expansion valve (14) is appropriately adjusted to keep the degree of superheat (EOS-EIS) constant.

As described above, the degree of opening of the electronic expansion valve (14) is adjusted according to the degree of superheat. Meanwhile, on condition that the high pressure HPT is above each specified pressure, if the degree of opening of the electronic expansion valve (14) is controlled so as to be forcibly reduced, the degree of opening of the electronic expansion valve (14) may be kept small in order to restrain the abnormal high pressure. In this case, the amount of refrigerant circulating through the refrigerant circuit (10) may become insufficient, and thus the amount of oil returned to the compressor (11) may also become insufficient. Therefore, in the refrigeration system (1) of this embodiment, when the amount of the refrigerant circulating through the refrigerant circuit (10) is judged to be insufficient, the volume of an air delivered by the evaporator fan (22) is changed.

To be specific, as shown in the state transition diagram in FIG. 3, on condition that, during chilling operation, the volume level of the air delivered by the evaporator fan (22) is high (H), if the degree of opening of the electronic expansion valve (14) is kept equal to or smaller than a specified degree of opening (e.g., 15%) for a predetermined or longer time (e.g., 10 or more minutes) or if the degree of superheat of the refrigerant in the evaporator (15) (EOS-EIS) is kept above a specified temperature (e.g., 25° C.) for a predetermined or longer time (e.g., 10 or more minutes), the amount of the circulating refrigerant is judged to be insufficient. In this case, the controller (40) changes the volume of the air delivered by the evaporator fan (22) from a high air volume level (H) to a low air volume level (L). As a result, the amount of heat absorbed in the refrigerant in the evaporator (15) is reduced, and thus, with this reduction, the refrigerant can be certainly condensed in the condenser (12) by just that much. Therefore, in the refrigerant circuit (10), the high pressure HPT is reduced. In view of the above, since the degree of opening of the electronic expansion valve (14) is increasing gradually with the degree of superheat (EOS-EIS), lack of the amount of the circulating refrigerant is also resolved.

Meanwhile, on condition that, in the above-mentioned procedure, the evaporator fan (22) is operated at the low air volume level (L), if the degree of opening of the electronic expansion valve (14) is kept equal to or larger than a specified degree of opening (e.g., 40%) for a predetermined or longer time (e.g., three or more minutes) and the degree of superheat of the refrigerant in the evaporator (15) (EOS-EIS) is kept below a specified temperature (e.g., 6° C.) for a predetermined or longer time (e.g., three or more minutes), lack of the amount of the circulating refrigerant is judged to have been resolved. As a result, the controller (40) again changes the air volume level of the evaporator fan (22) to a high air volume level (H). In this way, the evaporator fan (22) is operated.

Moreover, even on condition that the evaporator fan (22) is operated at the low air volume level (L), if the degree of opening of the electronic expansion valve (14) is kept equal to or smaller than a specified degree of opening (e.g., 15%) for a predetermined or longer time (e.g., 10 or more minutes) or if the degree of superheat of the refrigerant in the evaporator (15) (EOS-EIS) is kept above a specified temperature (e.g., 25° C.) for a predetermined or longer time (e.g., 10 or more minutes), the amount of the circulating refrigerant is judged to be still insufficient. This judgment allows the controller (40) to stop the evaporator fan (22). As a result, in the evaporator (15), the amount of heat absorbed in the refrigerant is further reduced, leading to a further reduction in the high pressure HPT in the refrigerant circuit (10). In view of the above, since the degree of opening of the electronic expansion valve (14) is further increasing with the degree of superheat (EOS-EIS), lack of the amount of the circulating refrigerant is also resolved.

On the other hand, on condition that, in the above-mentioned procedure, the evaporator fan (22) is stopped, if the degree of opening of the electronic expansion valve (14) is kept equal to or larger than a specified degree of opening (e.g., 40%) for a predetermined or longer time (e.g., three or more minutes) and the degree of superheat of the refrigerant in the evaporator (15) (EOS-EIS) is kept below a specified temperature (e.g., 6° C.) for a predetermined or longer time (e.g., three or more minutes), lack of the amount of the circulating refrigerant is judged to have been resolved. As a result, the controller (40) again changes the air volume level of the evaporator fan (22) to the low air volume level (L), thereby operating the evaporator fan (22). Also when the evaporator fan (22) is stopped for two or more minutes, the air volume level of the evaporator fan (22) is again changed to the low air volume level (L) in order to avoid an increase in the indoor temperature, thereby operating the evaporator fan (22).

When the volume level of the air delivered by the evaporator fan (22) is changed as described above, a flag indicating whether or not the amount of the circulating refrigerant is insufficient holds. More particularly, when the amount of the circulating refrigerant is insufficient and thus the volume of the air delivered by the evaporator fan (22) is reduced, the controller (40) allows the relationship of flag (FLG)=1 to hold. On the other hand, when lack of the amount of the circulating refrigerant has been resolved and thus the volume of the air delivered by the evaporator (22) is increased, the controller (40) allows the relationship of flag (FLG)=0 to hold.

Figure 2:
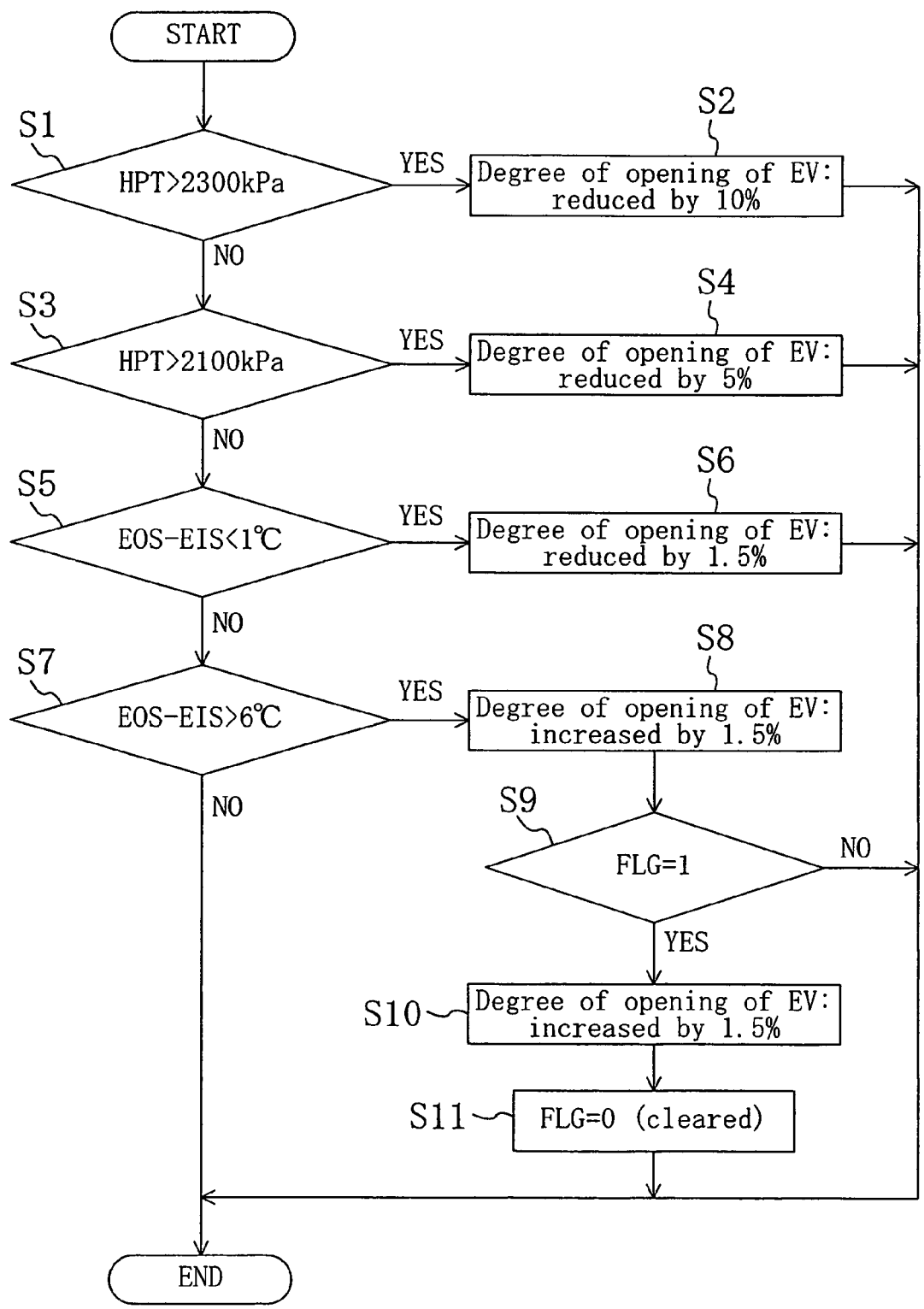
FIG. 2 is a flow chart showing a control procedure of an electronic expansion valve according to each of the first embodiment and a second embodiment.

When, in step S9, the flag (FLG) is equal to one (the amount of the circulating refrigerant is insufficient) after, in step S7 shown in FIG. 2, the degree of superheat (EOS-EIS) is above 6° C. and thus in step S8, the degree of opening of the electronic expansion valve (14) is increased by 1.5%, the degree of opening of the electronic expansion valve (14) is further forcibly increased by 1.5% (step S10). This forcible increase allows lack of the amount of the circulating refrigerant to be promptly resolved. After, in step S10, the degree of opening of the electronic evaporation valve (14) is forcibly increased, the flag is cleared (the flag (FLG)=0) in step S11. In view of the above, unless the amount of the circulating refrigerant again becomes insufficient and thus the relationship of the flag (FLG)=1 holds, the step S10 is not again executed.

Effects of this Embodiment

In the above-described embodiment, for example, under conditions that the outdoor temperature is extremely high, when the high pressure is above the specified pressure, the degree of opening of the electronic expansion valve (14) is forcibly reduced, thereby restraining an abnormal rise in the high pressure. This restraint can improve the reliability of the refrigerant system (1). Meanwhile, when the reduction in the degree of opening of the electronic expansion valve (14) causes the amount of the circulating refrigerant to become insufficient, the controller (40) senses this lack of the amount of the circulating refrigerant on the basis of the degree of superheat (EOS-EIS) or the degree of opening of the electronic expansion valve (14). This reduces the volume of the air delivered by the evaporator fan (22). As a result, the high pressure HPT can be reduced so that the degree of opening of the electronic expansion valve (14) is increased gradually with the degree of superheat (EOS-EIS). Therefore, lack of the amount of the refrigerant circulating through the refrigerant circuit (10) can be resolved, thereby ensuring a sufficient amount of oil returned to the compressor (11). This ensuring can prevent damage from being caused to the compressor (11), resulting in further improvement in the reliability of the refrigeration system (1).

Modified Example of Embodiment 1

In the first embodiment, on condition that the amount of the circulating refrigerant is judged to be insufficient, the volume of the air delivered by the evaporator fan (22) is reduced, while, on condition that lack of the amount of the circulating refrigerant is judged to be resolved, the volume of the air delivered by the evaporator fan (22) is increased. However, for example, on condition that the amount of the circulating refrigerant is judged to be insufficient, the operation of an evaporator fan (22) may be changed from continuous operation to intermittent operation, while, on condition that lack of the amount of the circulating refrigerant is resolved, the operation of the evaporator fan (22) may be changed from intermittent operation to continuous operation. Also in this case, when the amount of the circulating refrigerant is insufficient, the amount of heat absorbed in refrigerant in an evaporator (15) can be reduced, resulting in a reduction in the high pressure. This reduction in the high pressure can increase the degree of opening of an electronic expansion valve (14) so that lack of the amount of oil returned to a compressor (11) can be resolved.

Embodiment 2

A refrigeration system (1) of a second embodiment can cool the inside of a container and simultaneously adjust the humidity of an indoor air.

As shown in FIG. 4, a refrigerant circuit (10) is provided with a bypass pipe (20). While one end of the bypass pipe (20) is connected between the discharge side of a compressor (11) and the inflow side of a condenser (12), the other end thereof is connected between an electronic expansion valve (14) and the inflow side of an evaporator (15).

This bypass pipe (20) is connected with a solenoid valve (SV), a reheat coil (16), and a capillary tube (17) in this order from its inflow side to its outflow side.

The reheat coil (16) is located inside the container in which the evaporator (15) is placed and configured such that the indoor air flowing out of the evaporator (15) passes through the reheat coil (16). This reheat coil (16) forms a heating heat exchanger for reheating, by refrigerant, the indoor air cooled in the evaporator (15).

—Operational Behavior—

During chilling operation of the refrigeration system (1) of the second embodiment, the refrigeration system (1) basically operates in the same refrigeration cycle as in the first embodiment. More particularly, during normal chilling operation, the solenoid valve (SV) is closed, refrigerant discharged from the compressor (11) flows through the condenser (12), a liquid receiver (13), the electronic expansion valve (14), and the evaporator (15), and an indoor air is cooled by the evaporator (15).

Meanwhile, for example, when the humidity detected by a humidity sensor placed indoors is above a set humidity, the solenoid valve (SV) is opened. As a result, part of the refrigerant discharged from the compressor (11) is delivered to the reheat coil (16), and the rest thereof is delivered to the condenser (12) as usual. The refrigerant condensed by the reheat coil (16) is reduced in pressure by the capillary tube (17), and then the refrigerant reduced in pressure flows into the evaporator (15) together with refrigerant reduced in pressure by the electronic expansion valve (14). In the evaporator (15), the refrigerant absorbs heat from the indoor air and thus evaporates. As a result, the indoor air is cooled.

In the above-mentioned manner, the indoor air inside the container is controlled in temperature and dehumidified by the evaporator (15) and the reheat coil (16). More particularly, the indoor air is cooled using the evaporator (15) so as to be dehumidified to some extent and is further heated by the reheat coil to some extent so that its relative humidity is reduced.

Meanwhile, even during this chilling operation, when operation is continued under conditions that an outdoor temperature is extremely high, this continuation may lead to an abnormal rise in the high pressure HPT in the refrigerant circuit. To cope with this, also in the refrigeration system (1) of the second embodiment, like the first embodiment, the control procedure of the electronic expansion valve (14) shown in FIG. 2 is performed. Thus, in order to restrain a rise in the high pressure, the degree of opening of the electronic expansion valve (14) is forcibly reduced.

Meanwhile, on condition that the high pressure HPT is above a specified pressure, if, as described above, the degree of opening of the electronic expansion valve (14) is controlled so as to be forcibly reduced, the amount of refrigerant circulating through the refrigerant circuit (10) may become insufficient, and consequently the amount of oil returned to the compressor (11) may also become insufficient. To cope with this, in the refrigerant system (1) of the second embodiment, when the amount of the refrigerant circulating through the refrigerant circuit (10) is judged to be insufficient, the solenoid valve (SV) is opened independently of the indoor humidity.

More particularly, as shown in the state transition diagram in FIG. 5, on condition that normal chilling operation is performed with the solenoid valve (SV) closed, if the degree of opening of the electronic expansion valve (14) is kept equal to or smaller than a specified degree of opening (e.g., 15%) for a predetermined or longer time (e.g., 10 or more minutes) or if the degree of superheat of refrigerant at the evaporator (15) side (EOS-EIS) is kept above a specified temperature (e.g., 25° C.) for a predetermined or longer time (e.g., 10 or more minutes), the amount of the circulating refrigerant is judged to be insufficient. Thus, the controller (40) allows the solenoid valve (SV) to open. As a result, the refrigerant is condensed by both the condenser (12) and the reheat coil (16), thereby reducing the high pressure HPT in the refrigerant circuit (10). Consequently, the high pressure HPT falls below the specified high pressure, and thus the degree of opening of the electronic expansion valve (14) is increasing gradually with the degree of superheat (EOS-EIS). Therefore, lack of the amount of the circulating refrigerant is resolved.

On the other hand, on condition that, in the above-mentioned procedure, the solenoid valve (SV) is opened, if the degree of opening of the electronic expansion valve (14) is kept equal to or larger than a specified degree of opening (e.g., 40%) for a predetermined or longer time (e.g., three or more minutes) and the degree of superheat of the refrigerant in the evaporator (15) (EOS-EIS) is kept below a specified temperature (e.g., 6° C.) for a predetermined or longer time (e.g., three or more minutes), lack of the amount of the circulating refrigerant is judged to have been resolved. As a result, the controller (40) allows the solenoid valve (SV) to close. Furthermore, also if the solenoid valve (SV) is kept open for one or more hours, the solenoid valve (SV) is closed in order to avoid an increase in the indoor temperature. As a result, in the refrigerant circuit (10), normal chilling operation is resumed.

When, as described above, the position of the solenoid valve (SV) is switched between its closing position and its opening position, a flag indicating whether or not the amount of the circulating refrigerant is insufficient holds. More particularly, when the amount of the circulating refrigerant is insufficient and thus the solenoid valve (SV) is opened, the controller (40) allows the relationship of flag (FLG)=1 to hold. On the other hand, when lack of the amount of the circulating refrigerant has been resolved and thus the solenoid valve (SV) is closed, the controller (40) allows the relationship of flag (FLG)=0 to hold. When, in steps S9 and S10 shown in FIG. 2, the flag (FLG) is equal to one (the amount of the circulating refrigerant is insufficient), the degree of opening of the electronic expansion valve (14) is further forcibly increased by 1.5% like the first embodiment. This allows lack of the amount of the circulating refrigerant to be promptly resolved.

Effects of Embodiment 2

In the second embodiment, when the amount of the circulating refrigerant is judged to be insufficient, the refrigerant discharged from the compressor (11) is delivered through the bypass pipe (20) between the electronic expansion valve (14) and the evaporator (15). This delivery reduces the amount of refrigerant flowing through the condenser (12). Therefore, the refrigerant can be effectively condensed by the condenser (12). This can reduce the high pressure HPT in the refrigerant circuit (10). Furthermore, since in the second embodiment the refrigerant delivered to the bypass pipe (20) is condensed in the reheat coil (16), this situation can further certainly reduce the high pressure HPT in the refrigerant circuit (10). In view of the above, the degree of opening of the electronic expansion valve (14) is increased so that lack of the amount of the circulating refrigerant can be promptly resolved. This resolution can ensure a sufficient amount of refrigerating machine oil for the compressor (11).

Moreover, in the second embodiment, the reheat coil (16) is utilized for indoor dehumidification. In other words, in the second embodiment, the bypass pipe (20), the reheat coil (16), the capillary tube (17), and the solenoid valve (SV) are used as both humidity adjusters for the indoor air and a means for resolving lack of the amount of the circulating refrigerant. This can reduce the number of components of the refrigeration system (1).

Modified Example of Embodiment 2

In the second embodiment, the reheat coil (16) is connected to the bypass pipe (20). However, a bypass pipe (20) may be provided without a reheat coil (16). In the configuration of this modified example, when the amount of circulating refrigerant is judged to be insufficient, refrigerant discharged from a compressor (11) flows through a bypass pipe (20) and is reduced in pressure in a capillary tube (17). Thereafter, the refrigerant reduced in pressure flows into an evaporator (15) together with refrigerant reduced in pressure in the electronic expansion valve (14). When, as described above, the refrigerant discharged from the compressor (11) bypasses a condenser (12), this bypass reduces the amount of refrigerant flowing through the condenser (12). As a result, the refrigerant can be certainly condensed in the condenser (12). In view of the above, also in this modified example, the high pressure HPT is reduced, thereby opening the electronic expansion valve (14). As a result, lack of the amount of the circulating refrigerant can be resolved.

Moreover, instead of the reheat coil (16), a drain pan heater for melting a block of ice recovered in a drain pan for the evaporator (15) may be connected to the bypass pipe (20). Also in this configuration, on condition that the amount of the circulating refrigerant is insufficient, if the solenoid valve (SV) is opened, the refrigerant is condensed in the drain pan heater, thereby restraining a rise in the high pressure.

Other Embodiments

In the above embodiments, only the chilling operation of the refrigeration system (1) was described. When, also during freezing operation for freezing reserve materials in a container, the same control as during chilling operation is performed by a controller (40), this control can ensure a sufficient amount of oil returned to a compressor (11) while restraining an abnormal rise in the high pressure.

Furthermore, the refrigerant circuit (10) of the refrigeration system (1) of each of the above embodiments is provided with an air-cooled condenser (12) allowing heat to be exchanged between an outdoor air and refrigerant. However, it may be provided with not only this condenser (12) but also a water-cooled condenser allowing heat to be exchanged between cooling water and refrigerant.

The above embodiments are merely preferred embodiments in nature and are not intended to limit the scope, applications and use of the invention.

INDUSTRIAL APPLICABILITY

As described above, the present invention is useful for a measure for oil return in refrigeration systems for use in freight containers or other purposes.

The invention claimed is:

1. A refrigeration system comprising a refrigerant circuit connected with a compressor, a condenser, an electronic expansion valve, and an evaporator placed indoors and operating in a refrigeration cycle while refrigerant is circulated through the refrigerant circuit, the degree of opening of the electronic expansion valve being adjusted according to the degree of superheat of refrigerant at the evaporator side while being forcibly reduced under conditions that the high pressure in the refrigerant circuit is above a specified pressure, said refrigeration system further comprising an evaporator fan for delivering an indoor air to the evaporator and a controller for, when the amount of the refrigerant circulating through the refrigerant circuit is judged to be insufficient, reducing the volume of an air delivered by the evaporator fan.

2. The refrigeration system of claim 1, wherein when the degree of superheat of the refrigerant in the evaporator is kept above a specified degree of superheat for a predetermined time, the controller judges that the amount of the circulating refrigerant is insufficient.

3. The refrigeration system of claim 1, wherein when the degree of opening of the electronic expansion valve is kept below a specified degree of opening for a predetermined time, the controller judges that the amount of the circulating refrigerant is insufficient.

4. The refrigeration system of claim 1, wherein the compressor is composed of a scroll compressor.

5. A refrigeration system comprising a refrigerant circuit connected with a compressor, a condenser, an electronic expansion valve, and an evaporator and operating in a refrigeration cycle while refrigerant is circulated through the refrigerant circuit, the degree of opening of the electronic expansion valve being adjusted according to the degree of superheat of refrigerant at the evaporator side while being forcibly reduced under conditions that the high pressure in the refrigerant circuit is above a specified pressure,
said refrigeration system further comprising an evaporator fan for delivering an indoor air to the evaporator and a controller for, when the amount of the refrigerant circulating through the refrigerant circuit is judged to be insufficient, changing operation of the evaporator fan from continuous operation to intermittent operation.

6. The refrigeration system of claim 5, wherein when the degree of superheat of the refrigerant in the evaporator is kept above a specified degree of superheat for a predetermined time, the controller judges that the amount of the circulating refrigerant is insufficient.

7. The refrigeration system of claim 5, wherein when the degree of opening of the electronic expansion valve is kept below a specified degree of opening for a predetermined time, the controller judges that the amount of the circulating refrigerant is insufficient.

8. The refrigeration system of claim 5, wherein the compressor is composed of a scroll compressor.

9. A refrigeration system comprising a refrigerant circuit connected with a compressor, a condenser, an electronic expansion valve, and an evaporator and operating in a refrigeration cycle while refrigerant is circulated through the refrigerant circuit, the degree of opening of the electronic expansion valve being adjusted according to the degree of superheat of refrigerant at the evaporator side while being forcibly reduced under conditions that the high pressure in the refrigerant circuit is above a specified pressure,
wherein the refrigerant circuit is provided with a bypass pipe connected at one end between the compressor and the condenser and connected at the other end between the electronic expansion valve and the evaporator and a closing/opening valve for closing and opening the bypass pipe, and
the refrigeration system further comprises a controller for, when the amount of the refrigerant circulating through the refrigerant circuit is judged to be insufficient, opening the closing/opening valve.

10. The refrigeration system of claim 9, wherein the bypass pipe is provided with a heating heat exchanger for heating an indoor air by the refrigerant, the evaporator being placed indoors.

11. The refrigeration system of claim 9, wherein when the degree of superheat of the refrigerant in the evaporator is kept above a specified degree of superheat for a predetermined time, the controller judges that the amount of the circulating refrigerant is insufficient.

12. The refrigeration system of claim 9, wherein when the degree of opening of the electronic expansion valve is kept below a specified degree of opening for a predetermined time, the controller judges that the amount of the circulating refrigerant is insufficient.

13. The refrigeration system of claim 9, wherein the compressor is composed of a scroll compressor.

* * * * *